(12) United States Patent
Wendt

(10) Patent No.: US 7,417,421 B2
(45) Date of Patent: Aug. 26, 2008

(54) ARRANGEMENT FOR MEASURING THE ANGULAR POSITION OF AN OBJECT

(75) Inventor: Matthias Wendt, Wuerselen (DE)

(73) Assignee: NXP B.V., Eindhoven (NL)

( * ) Notice: Subject to any disclaimer, the term of this patent is extended or adjusted under 35 U.S.C. 154(b) by 10 days.

(21) Appl. No.: 10/481,146

(22) PCT Filed: Jul. 2, 2002

(86) PCT No.: PCT/IB02/02649

§ 371 (c)(1),
(2), (4) Date: Dec. 17, 2003

(87) PCT Pub. No.: WO03/004973

PCT Pub. Date: Jan. 16, 2003

(65) Prior Publication Data

US 2004/0160220 A1 Aug. 19, 2004

(30) Foreign Application Priority Data

Jul. 3, 2001 (DE) ................. 101 32 215

(51) Int. Cl.
*G01B 7/30* (2006.01)
(52) U.S. Cl. .............................. 324/207.25; 324/207.21
(58) Field of Classification Search .............. 324/207.2, 324/207.21, 207.22, 207.25, 174, 207.12, 324/244–263; 338/32 H, 32 R
See application file for complete search history.

(56) References Cited

U.S. PATENT DOCUMENTS

| 3,112,464 | A | * | 11/1963 | Ratajski et al. ............ 338/32 H |
| 4,492,922 | A | * | 1/1985 | Ohkubo ................... 324/207.21 |
| 4,875,008 | A | * | 10/1989 | Lorenzen ................ 324/207.21 |
| 5,523,679 | A | * | 6/1996 | Kalb ........................... 324/165 |
| 5,532,585 | A | * | 7/1996 | Oudet et al. ............. 324/207.22 |
| 5,680,042 | A | * | 10/1997 | Griffen et al. ........... 324/207.21 |

(Continued)

FOREIGN PATENT DOCUMENTS

DE 4301704 7/1994

(Continued)

OTHER PUBLICATIONS

Irwin et al., Basic Engineering Circuit Analysis, Sixth Edition, 1999, Published by John Wiley & Sons Inc., p. 73.*

(Continued)

*Primary Examiner*—Patrick Assouad
*Assistant Examiner*—David M. Schindler
(74) *Attorney, Agent, or Firm*—Peter Zawilski

(57) ABSTRACT

Arrangement for measuring the angular position of an object, using planar magnetoresistive sensors (6, 9) through which an electric current flows and which are arranged in a magnetic field which is parallel to their respective planes, which magnetic field is generated by an arrangement of magnets (4, 14) rotatably journaled eccentrically on a shaft (11), the angular position of the shaft (11) corresponding to that of the object to be measured.

22 Claims, 4 Drawing Sheets

U.S. PATENT DOCUMENTS

| | | | |
|---|---|---|---|
| 5,880,586 A * | 3/1999 | Dukart et al. | 324/207.2 |
| 6,137,288 A * | 10/2000 | Luetzow | 324/207.2 |
| 6,154,025 A * | 11/2000 | Schelter et al. | 324/207.21 |
| 6,160,395 A * | 12/2000 | Goetz et al. | 324/207.21 |
| 6,201,389 B1 * | 3/2001 | Apel et al. | 324/207.2 |
| 6,229,299 B1 * | 5/2001 | Strashny | 324/174 |
| 6,271,660 B1 * | 8/2001 | Sprecher, Jr. | 324/207.13 |
| 6,326,779 B1 * | 12/2001 | Shinjo et al. | 324/207.21 |
| 6,396,259 B1 * | 5/2002 | Washeleski et al. | 324/207.22 |
| 6,404,185 B1 * | 6/2002 | Allwine | 324/207.2 |
| 6,489,761 B1 * | 12/2002 | Schroeder et al. | 324/207.25 |
| 6,646,435 B1 * | 11/2003 | Nakamura et al. | 324/207.25 |

FOREIGN PATENT DOCUMENTS

JP    03206914 A  *  9/1991

OTHER PUBLICATIONS

The American Heritage College Dictionary, Fourth Edition, 2002, pp. 442 and 749.*

Philips data sheet, Contactless Angle Measurement using KMZ41 and UZZ9000, AN 00023, published Mar. 24, 2000.

* cited by examiner

ARRANGEMENT FOR MEASURING THE ANGULAR POSITION OF AN OBJECT

The invention relates to an arrangement for measuring the angular position of an object, using planar magnetoresistive sensors through which electric current flows and which are arranged in a magnetic field which is parallel to a plane defined by their surfaces. The magnetic field is generated by an arrangement of magnets rotatably journaled on a shaft. The angular position of the shaft corresponds to that of the object to be measured.

A magnetoresistive sensor consists of at least one magnetoresistive resistor which is constituted by a ferromagnetic foil arranged in a thin-film substrate. To eliminate temperature influences and production spreads, four magnetoresistive resistors are preferably used in a bridge circuit. The output voltage at the bridge is a measure of the angle $\alpha$ between the magnetization of the sensor surface and the current direction and is proportional to the function $\sin(2\alpha)$.

Magnetoresistive sensors are known which consist of two resistive bridges, the second being rotated by 45 degrees with respect to the first. A measurable angle range of substantially 180° is thereby achieved.

It is known from Philips data sheet AN 00023 published on 24 Mar. 2000 that two permanent magnets are arranged on the inner side of a flux guide ring in such a way that they face each other and that the magnetic field built up in between them is homogeneous at least in the region covering the magnetic field sensor. This flux guide ring is centrically arranged on the shaft of the object to be measured. Facing the end of the rotary shaft is the magnetoresistive sensor arranged orthogonally with respect to the axis of rotation. In this arrangement, the angle of rotation $\alpha$ of the object to be measured is identical to the angle of rotation $\alpha$ of the magnetic field on the sensor surface. Due to the anisotropic effect, which does not supply any information about the magnetic field polarity, the measurable angular range is limited to 180 degrees. This means that the signal which is generated at an angular rotation of 10 degrees exactly corresponds to the signal which is generated at an angular rotation of 180 degrees plus 10 degrees, i.e. 190 degrees.

The use of magnetoresistive sensors in compasses is known from DE 43 01 704 A1, i.e. it covers an angular range of 360 degrees. For this purpose, two elaborate magnetoresistive sensors are required which are formed with a layer system consisting of a plurality of superimposed layers having layer planes that are directed at least substantially parallel to the plane of rotation, in which at least one measuring layer with a magnetization which is rotatable by the magnetic field in its layer plane and at least one bias layer with a magnetization which is at least substantially independent of the magnetic field in its layer plane are provided and the electric resistance of the magnetoresistive sensor depends on the angle between the magnetization of the measuring layer and the magnetization of the bias layer. When used as compasses, the magnetic field influencing the current intensity is the earth's magnetic field so that a dependence upon the position of the object to be measured relative to earth is obtained. The reference point $f=0°$ can neither be freely defined.

This publication does not state how the complete rotation of an object can be determined, which object rotates about a given freely selectable shaft and is provided with an arrangement of magnets.

It is therefore an object of the invention to provide an arrangement for measuring the angular position of an object which may be between 0 degree and a complete rotation. The axis of rotation of the object relative to earth should be freely selectable. This arrangement should consist of relatively simple sensor components which, however, simultaneously eliminate temperature influences and production spreads.

According to the invention, the object is achieved in that the rotationally symmetrical arrangement of magnets is eccentrically journaled with respect to the axis of symmetry. In a variant, the object according to the invention is achieved in that the centrically journaled arrangement of magnets has an asymmetrical cross-section. In both arrangements according to the invention, an unambiguous combination of the magnetic field vectors on the two magnetoresistive sensors is evaluated for any possible angular position of the arrangement of magnets between 0 and 360 degrees. The unambiguous assignment between the combinations of the two magnetic field vectors, on the one hand, and the angular position to be measured, on the other hand, is achieved in that the output signal of every single magnetoresistive sensor exactly covers a period during which the arrangement of magnets exactly describes one complete rotation. This is achieved in that, according to the invention, the angle a changing the output signal at the magnetoresistive sensor is not identical to the angle f describing the angular position of the object to be measured.

A magnetoresistive sensor of the type described in the opening paragraph has a periodical output signal of 180 degrees, i.e. for the angles $\alpha=X$, the output signal assumes the same (voltage) value as for $\alpha=X+180°$, $\alpha=X+360°$ and $\alpha=X+540°$, etc. This is conditioned by the construction of the magnetoresistive sensor which has proved to be reliable in many applications of contactless angular position measurements.

In the arrangement according to the invention, the 180-degree periodicity of the output signal is eliminated in that the angle $\alpha$ initially increases from substantially 0 to substantially 180 degrees and subsequently decreases again to substantially 0 degree. The turning point of the angle $\alpha$ is preferably at the angular position $f=180$ degrees. The output signal of the magnetoresistive sensor dependent on the angle $\alpha$ is thus mirrored with respect to the angle of rotation f at $f=180$ degrees on a (presumed) abscissa. As a result, the output value for the angle $\alpha=X+180$ degrees is no longer the same as for $\alpha=X$.

Consequently, a plurality of values of the angle f is assigned to the values of the output signal of a single magnetoresistive sensor. The unambiguous situation is achieved only by comparison with the output signal of the second magnetoresistive sensor. Conditioned by its position, this second sensor supplies an output signal which is shifted by 90 degrees with respect to the first sensor. Both output signals are connected to an electronic evaluation circuit.

It is advantageous when the second magnetoresistive sensor is arranged in a plane perpendicular to the plane of the first sensor. As a result, the arrangement of magnets covers the second magnetoresistive sensor only one quarter of a rotation later. Since the two magnetoresistive sensors have the same structure, their output signal is uniform. Due to the required mutual arrangement of the two sensors, their output signals are phase-shifted by 90 degrees.

It is advantageous when the arrangement of magnets comprises a centrally arranged permanent magnet, an external ferromagnetic circuit and an air gap in between. The field lines emanating from the permanent magnet are concentrated and fed back by the ferromagnetic circuit which has a larger permeability than air.

In a variant, the permanent magnet has a cam-shaped cross-section. It is thereby ensured that each of the two magnetoresistive sensors is influenced by a different magnetic field at the same instant, i.e. the two output signals are phase-shifted with respect to each other.

To avoid ferritic contaminations, the air gap of the arrangement of magnets may be filled up with a non-conducting material, for example, a synthetic resin material.

When the planes of the two planar magnetoresistive sensors are arranged parallel to the axis of rotation of the object to be measured, the use of an arrangement of magnets having a very simple and thus cost-efficient structure is possible.

When the two magnetoresistive sensors are arranged on a common carrier plate, they are thermally connected together and change their properties evenly with a change of temperature. They are preferably mounted perpendicularly on this common carrier plate in order that the region which is sensitive to the measurement is as far remote from it as possible.

The carrier plate is preferably arranged perpendicularly to the axis of rotation of the object to be measured in order that the distance between the two sensors is uniformly large with respect to the arrangement magnets.

In one embodiment, the magnetoresistive sensors form part of an integrated circuit so that mounting of the arrangement of magnets is easy and cost-efficient.

In a preferred embodiment, a magnetoresistive sensor comprises at least one Wheatstone bridge with four magnetoresistive resistors each, in order that a compensation of spreads in the production of the single resistors is already realized for the output signal.

It is essential for the invention that, either by the eccentric arrangement of an arrangement of magnets built up rotationally symmetrically or by the central arrangement of a permanent magnet having an asymmetrical cross-section, a non-homogeneous magnetic field is generated whose field line variation is a measure of the angular position of the object to be measured.

These and other aspects of the invention are apparent from and will be elucidated with reference to the embodiments described hereinafter.

Figure 1:
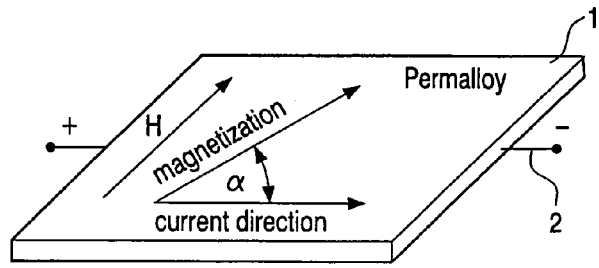
FIG. 1 shows the magnetoresistive effect in a thin-film structure.

FIG. 1 shows diagrammatically the thin-film structure 1 of a magnetoresistive resistor. A conductor 2, through which a current flows, is superimposed by a magnetic field which is parallel to the plane of the thin-film structure 1. The resistance changes with a changing angle a between the magnetization and the current direction. This is expressed by the equation $R=R_0+\Delta R \cos^2\alpha$.

Figure 2:
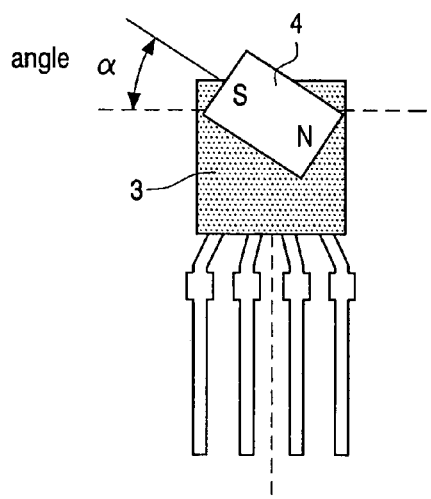
FIG. 2 shows the magnetoresistive sensor with the associated permanent magnet.
Figure 3:
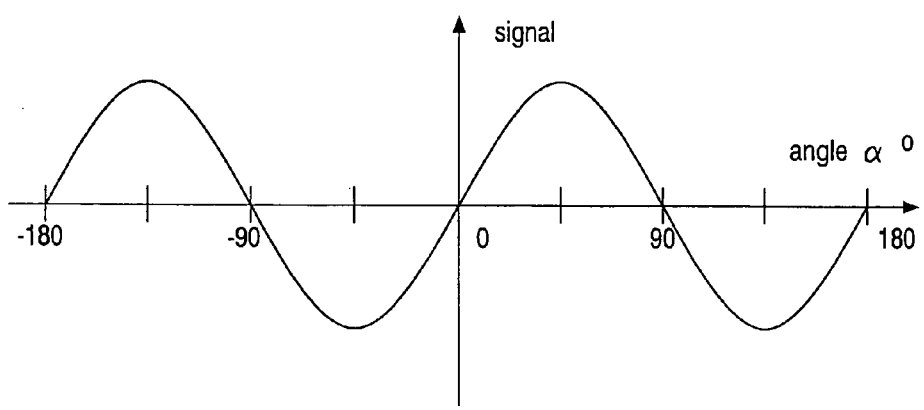
FIG. 3 shows the associated output signal.

FIG. 2 shows the magnetoresistive sensor as an integrated circuit 3, while the permanent magnet 4 is only indicated. The associated diagram in FIG. 3 shows the output signal of the bridge circuit. It is a sinusoidal output signal having a period of 180 degrees.

Figure 4:
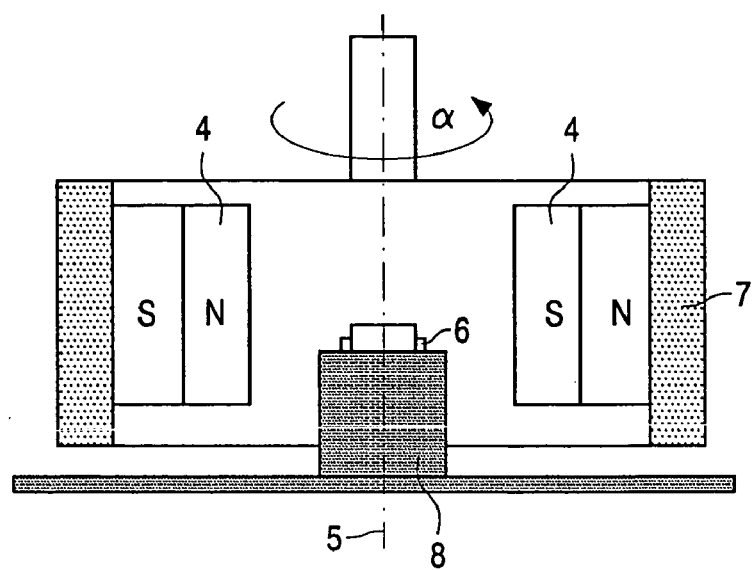
FIG. 4 shows an arrangement in a cross-section.
Figure 5:
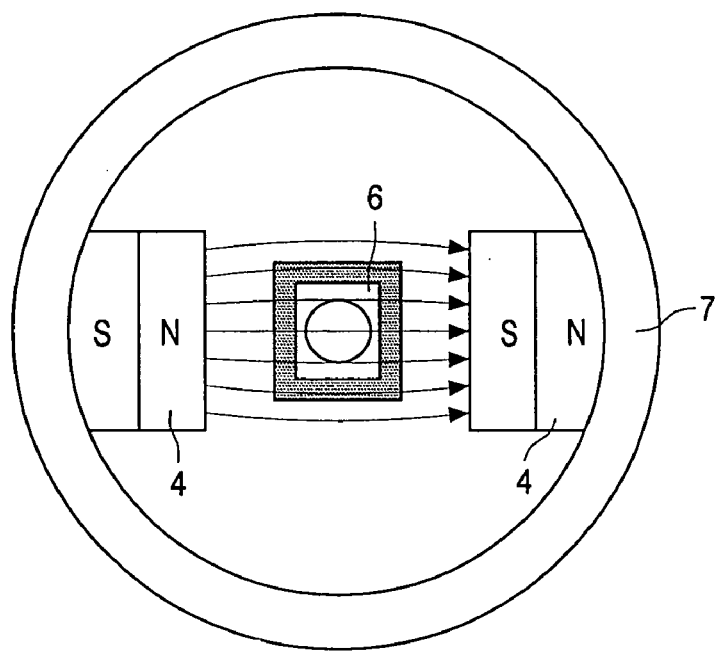
FIG. 5 shows an arrangement in a top down view.

FIGS. 4 and 5 show the state of the art with a homogeneous magnetic field which is generated by two permanent magnets 4, the axis of rotation 5, the magnetoresistive sensor 6 arranged perpendicularly thereto and the angle of rotation α. The two permanent magnets 4 are arranged on an external flux guide ring 7 which additionally ensures shielding from magnetic external influences. The magnetoresistive sensor 6 is fixed to a non-ferriferous support 8.

Figure 6:
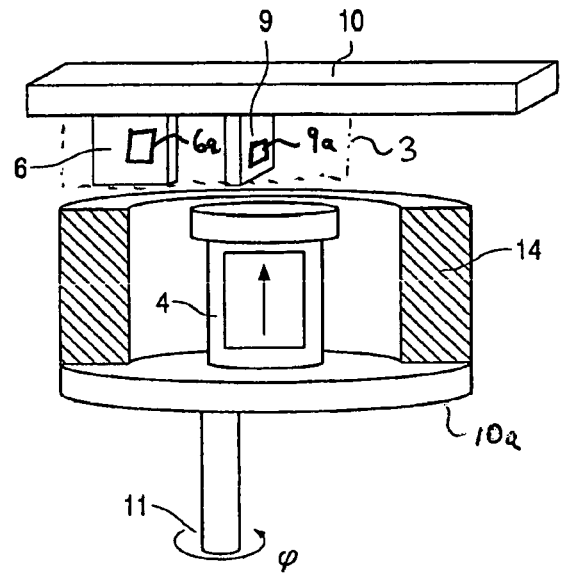
FIG. 6 shows the arrangement according to the invention in a partial cross-section.

FIG. 6 shows the arrangement according to the invention. The two magnetoresistive sensors 6, 9 are arranged perpendicularly on the carrier plate 10 which is only indicated. It can clearly be seen that the permanent magnet 4 is arranged eccentrically with respect to the axis of rotation 11, and supported by a structure 10a journaled on the shaft 11. The Figure does not show that the shaft 11 is connected to the object to be measured.

Figures 7A, 7B, 7C:
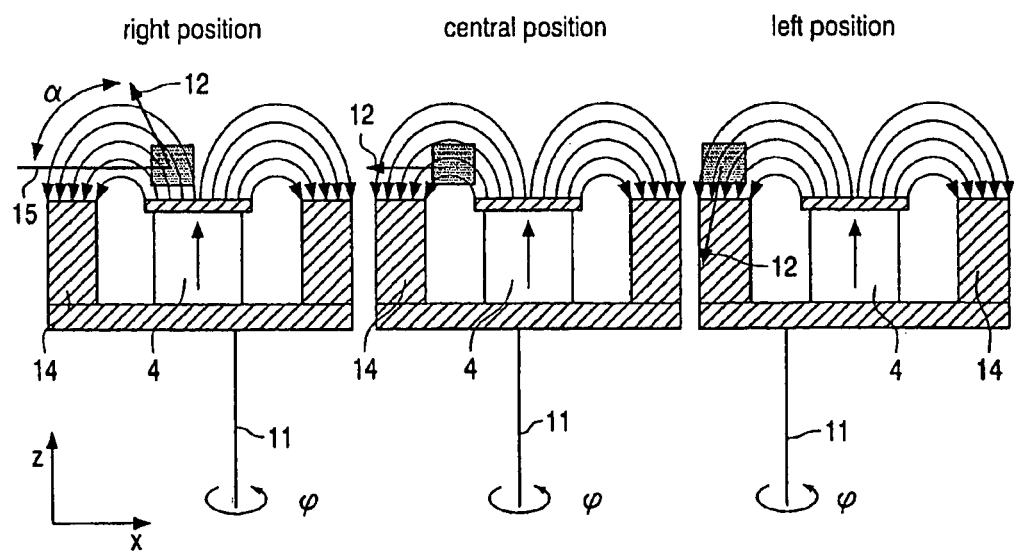
FIGS. 7a to 7c show the rotation of the magnetic field vector in the sensor plane.

FIGS. 7a to 7c show, by way of example, with reference to the magnetoresistive sensor 6 how the magnetic field vector 12 is a measure of the angle of rotation f of the object to be measured. Together with a straight line 15 which is parallel to the magnet poles, the magnetic field vector 12 constitutes the angle α. When the magnetoresistive sensor is centered above the air gap, the angle of magnetization is 0 degree (FIG. 7b). When it is over one of the two magnet poles, the angle of magnetization is substantially +90 degrees or substantially −90 degrees. The straight line 15 as an X axis and the axis of rotation 11 as a Z axis constitute the system of co-ordinates shown. The magnetoresistive sensor 6 is offset in the Z direction with respect to the magnet poles in order that they do not touch each other. In a preferred embodiment, the arrangement of magnets with the permanent magnet 4 and the ferromagnetic circuit 14 is dimensioned in such a way that, in the starting position of the object to be measured, i.e. f=0 degree, the magnetoresistive sensor is situated opposite one magnet pole (FIG. 7a), is centered above the air gap (FIG. 7b) after an angular rotation of f=90 degrees of the magnetoresistive sensor, and is situated opposite the other magnet pole (FIG. 7c) after a rotation of f=180 degrees. The magnetic field vector 12 meanwhile rotates counterclockwise so that the angle α changes. When the object is further rotated beyond 180 degrees, the positions shown are run through backwardly, i.e. from the position in FIG. 7c via the position in FIG. 7b back to the position in FIG. 7a, corresponding to a full rotation of 360 degrees. In the meantime, the magnetic field vector 12 rotates clockwise back to the starting position as shown in FIG. 7a. From the instant when the magnetic field vector 12 changes its sense of rotation, the output signal proceeds mirror-imaged until the magnetic field vector 12 has resumed its starting position as shown in FIG. 7a. A voltage having a period of 360 degrees is thus generated as an output signal for the magnetoresistive sensor. There is a measuring value for each angular position of the object to be measured. Since ambiguities occur in this fundamentally sinusoidal output signal, a comparison value is required. This value is generated by the second magnetoresistive sensor 9 which is arranged in a plane orthogonally to the plane of the first sensor and generates the same, but 90-degree phase-shifted, signal as the first magnetoresistive sensor.

In this preferred embodiment, almost the complete magnetic field is utilized for evaluation, which leads to a possibly high accuracy of the measuring result. Magnetoresistive sensors having the same structure and originating from the same production batch are preferably used. An effective suppression of effects which might be caused by spreads (e.g. temperature behavior) is thereby achieved.

Figure 8:
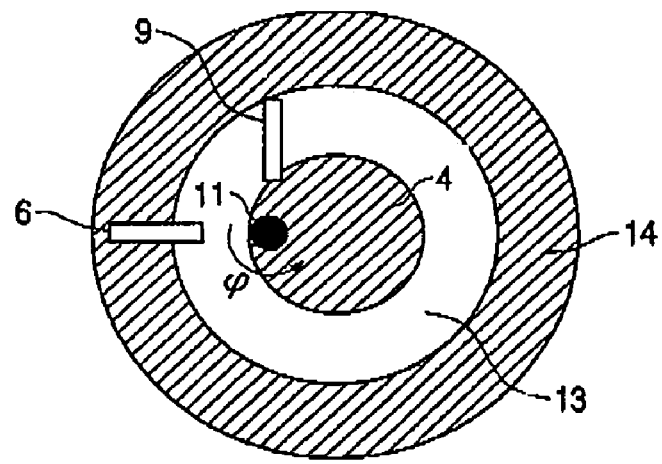
FIG. 8 is a plan view of the arrangement of the two magnetoresistive sensors and of the arrangement of magnets.

FIG. 8 is a plan view of the arrangement. It can clearly be seen that the magnet has a symmetrical structure with an air gap 13 of constant width between the permanent magnet and the external ferromagnetic circuit 14. The permanent magnet 4 is eccentrically arranged on the shaft 11.

Figure 9:
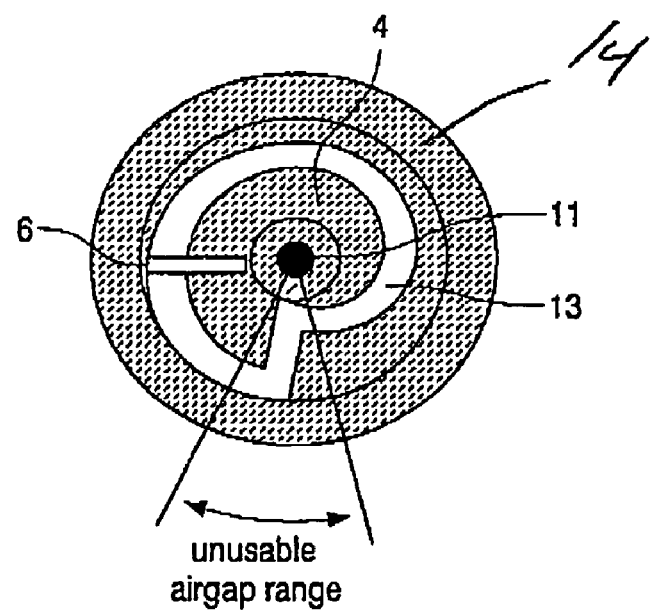
FIG. 9 shows an embodiment with a cam-shaped magnet core.

It can be seen from FIG. 9 that a throughput air gap is present, also when using an asymmetrical magnet. The air gap should possibly be uniformly wide in the useful range in order that the magnetic field is formed in a uniform manner. In the unused range, the air gap should widen in order that the flux concentrates on the useful range. The unusable air gap range is the one which extends radially.

Instead of the pot-shaped magnetic circuit shown in the embodiments, the field shape may also be directly generated by a correspondingly magnetized permanent magnetic material. For the purpose of magnetization, a current loop must be formed instead of the air gap, which current loop then exactly leaves back the desired magnetization. A suitable magnetization device produces the eccentric, annular magnetization.

The arrangement according to the invention has the advantages of contactless measurement, namely no mechanical abrasion of the components and thus no wear. Since the two magnetoresistive sensors are arranged on a common carrier plate, they are coupled as far as their temperature variations are concerned. A temperature change in the evaluation of the signals can therefore be ignored.

The arrangement according to the invention has the further advantage that it is independent of the magnetic field strength. Consequently, the tolerance-conditioned distance between the sensors and the arrangement of magnets has no influence on the measuring result.

The invention claimed is:

1. A device for measuring the angular position of a shaft with respect to an axis of rotation of the shaft that extends longitudinally within said shaft, comprising:
   a plurality of magnets configured for rotation with said shaft about said axis of rotation, the plurality of magnets generating a magnetic field; and
   a plurality of planar magnetoresistive sensors through which, for each sensor, an electric current flows parallel to a respective plane passing through a respective one of the sensors and being disposed such that said respective plane is arranged in parallel with said magnetic field,
   wherein the plurality of magnets are configured and disposed to collectively have rotational symmetry about a point offset from said axis of rotation such that the plurality of magnets do not collectively have rotational symmetry about said axis of rotation.

2. A device as claimed in claim 1, wherein said respective plane parallel to a first of said sensors is perpendicular to said respective plane parallel to a second of said sensors.

3. A device as claimed in claim 1, wherein the plurality of magnets includes a permanent magnet and an external ferromagnetic circuit, and air gap existing in between the permanent magnet and the circuit.

4. A device as claimed in claim 3, wherein said air gap is filled with a non-conducting material.

5. A device as claimed in claim 1, wherein an annular magnetization in a permanent-magnetic material generates the field.

6. A device as claimed in claim 3, wherein one of the respective planes and another of the respective planes are both parallel to an axis of rotation of said object.

7. A device as claimed in claim 1, wherein said plurality of planar magnetoresistive sensors consists of two sensors, said two sensors being arranged on a common carrier plate perpendicularly to said plate.

8. A device as claimed in claim 7, wherein the carrier plate is arranged perpendicularly to an axis of rotation of an object whose angular position is to be measured by said device, said object being connected to said shaft.

9. A device as claimed in claim 1, wherein the magnetoresistive sensors form part of an integrated circuit.

10. A device as claimed in claim 1, the plurality of magnetoresistive sensors includes a Wheatstone bridge with four magnetoresistive resistors.

11. The device of claim 1, wherein said shaft is connected to an object whose angular position is to be measured by said device.

12. The device of claim 1, wherein the plurality of magnets are supported by a structure implemented for rotation with said shaft.

13. The device of claim 12, wherein said shaft has an end upon which said structure is mounted.

14. The device of claim 1, configured such that rotation of said shaft through an angle of rotation rotates said plurality of magnets through an identical angle of rotation.

15. The device of claim 1, wherein the plurality of magnets are configured and disposed to collectively have axial symmetry.

16. A device for measuring the angular position of a shaft, comprising:
    a plurality of magnets configured for rotation with said shaft, the plurality of magnets generating a magnetic field; and
    a plurality of planar magnetoresistive sensors through which, for each sensor, an electric current flows parallel to a respective plane passing through each of a respective one of said sensors and being disposed such that each respective plane is arranged in parallel with said magnetic field;
    wherein, the plurality of magnets include a permanent magnet, and a cross-section of the permanent magnet as viewed along an axis of rotation of said shaft that extends longitudinally within said shaft lacks rotational symmetry, and wherein the plurality of magnets are configured and disposed to collectively have rotational symmetry about a point offset from said axis of rotation.

17. The device of claim 16, wherein said shaft is connect to an object such that an angular position of the shaft corresponds to that of said object and wherein the permanent magnet has a cam-shaped cross-section.

18. The device of claim 16, wherein the plurality of magnets are supported by a structure implemented for rotation with said shaft and wherein said shaft has an end upon which said structure is mounted.

19. The device of claim 16, configured such that rotation of said shaft through an angle of rotation rotates said plurality of magnets through an identical angle of rotation.

20. The device of claim 16, wherein said collective cross-section as viewed along said axis lacks radial symmetry.

21. A device for measuring an angular position of a shaft having an axis of rotation that is longitudinally within the shaft, comprising:
    a magnetic arrangement generating a magnetic field extending in a direction from an inner magnetic portion to an outer magnetic portion, the inner magnetic portion and the outer magnetic portion separated by a substantially nonmagnetic portion that the generated magnetic field extends across, and coupled to said shaft for 360 degrees of rotation with said shaft about the axis of rotation, the magnetic arrangement including a plurality of magnets configured and disposed to collectively have rotational symmetry about a point offset from said axis of rotation; and a magnetoresistive sensor for determining the angular position of said shaft by sensing an angle of the magnetic field dependent upon a position of the magnetoresistive sensor in said direction and relative to the inner magnetic portion and the outer magnetic portion, wherein the magnetoresistive sensor's position from the inner portion and the outer portion is a function of the angular position of the shaft.

22. The device of claim 21, further including another magnetoresistive sensor, wherein the magnetoresistive sensors are positioned perpendicular to the axis of rotation and at a same distance from the axis of rotation and where the magnetoresistive sensors are situated at about a 90 degree angle from each other relative to the axis of rotation.

* * * * *